Feb. 25, 1964     E. D. TURNER     3,121,919
INJECTION MOULDING MACHINE
Filed July 3, 1961     7 Sheets-Sheet 7
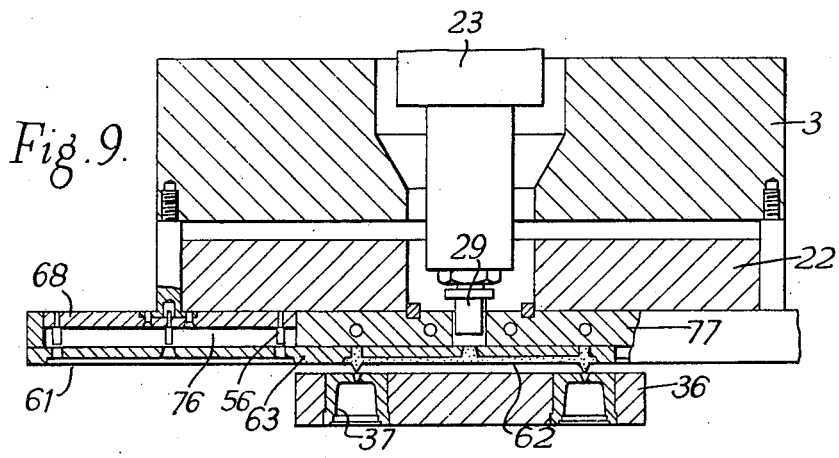
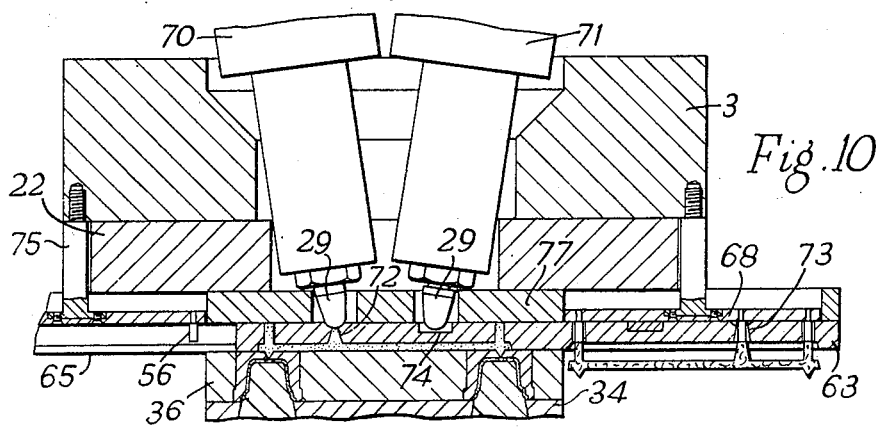
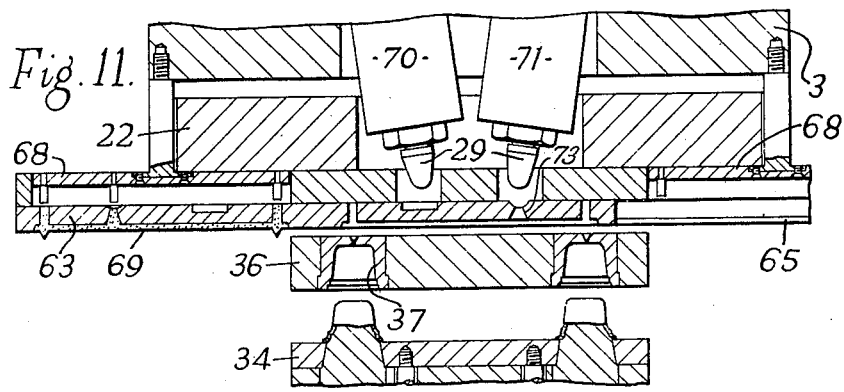

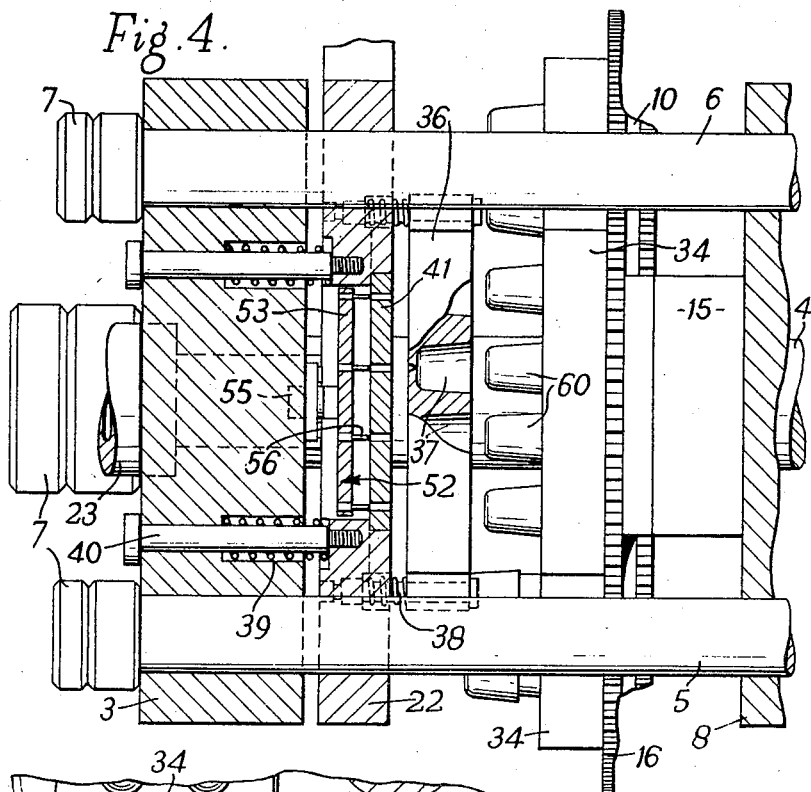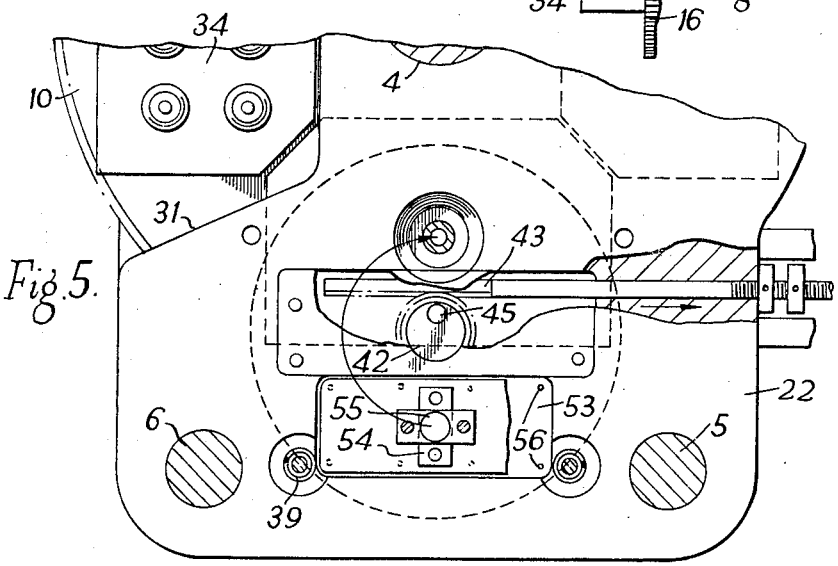

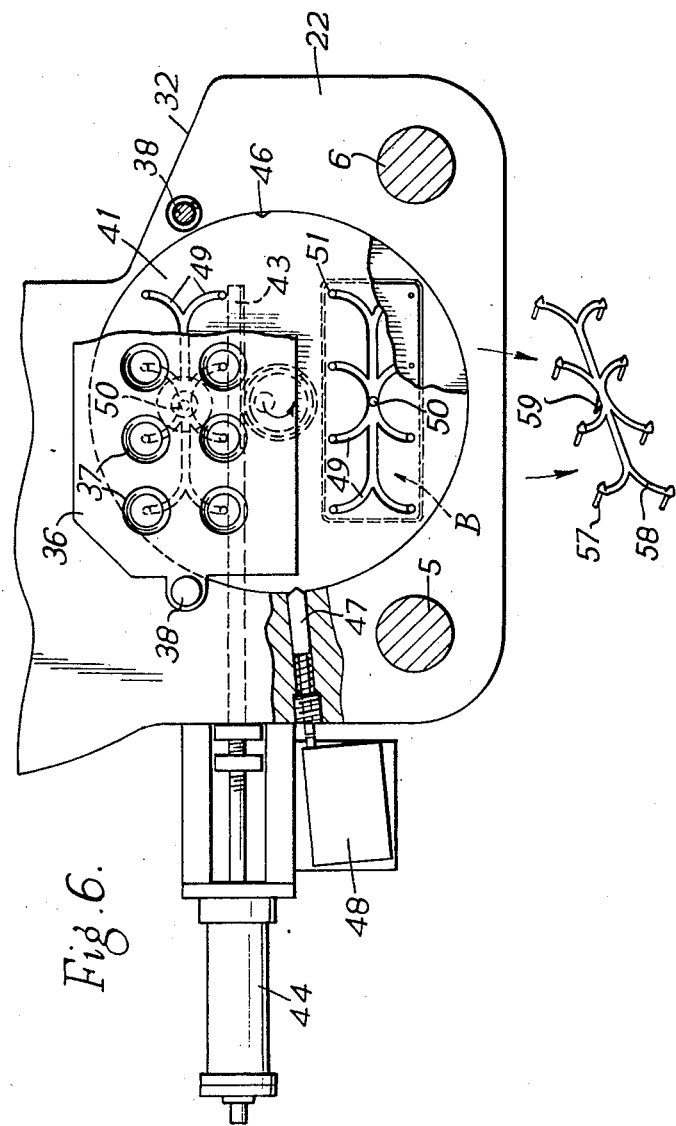

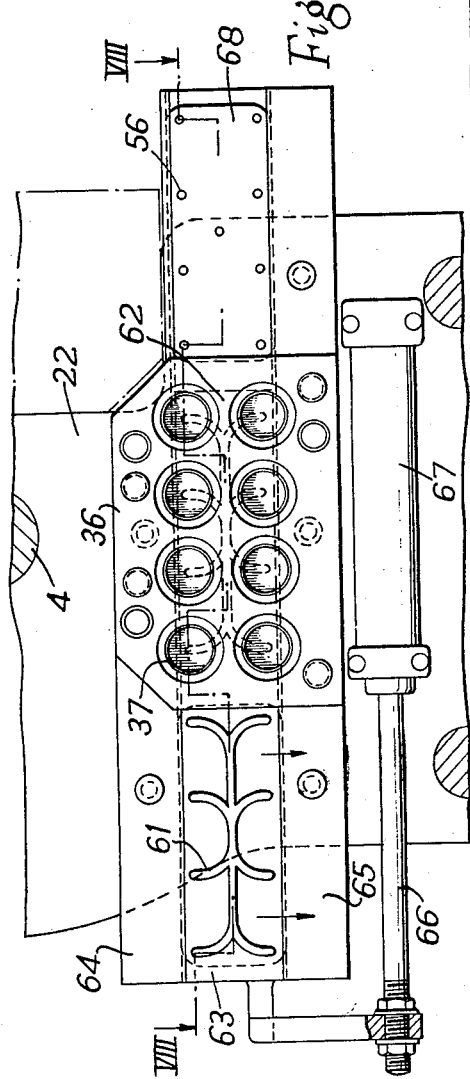
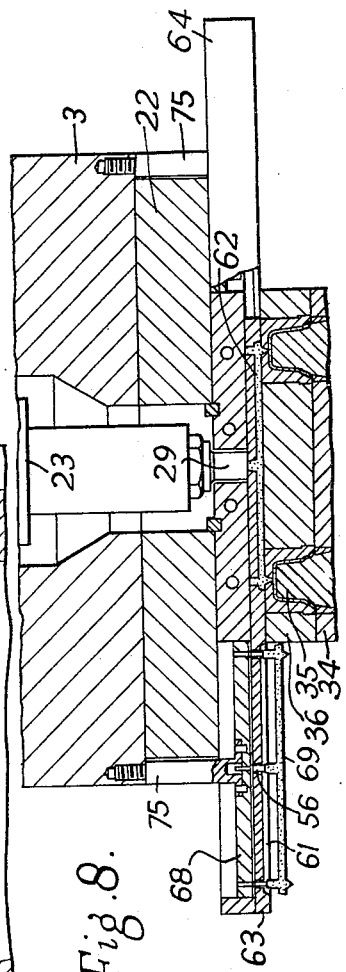

3,121,919
INJECTION MOULDING MACHINE
Edward Davey Turner, Highfield, Whitchurch, near Aylesbury, England, assignor to United Shoe Machinery Corporation, Boston, Mass., a corporation of New Jersey
Filed July 3, 1961, Ser. No. 121,536
Claims priority, application Great Britain July 14, 1960
2 Claims. (Cl. 18—30)

This invention relates to injection molding machines and is concerned with the problem of removing sprue from articles molded therein.

This problem has been attacked in various ways in the past, and the systems employed naturally vary with the form of molded article. In the case of multi-impression molds, in which the plastic is injected through a channel system (hereinafter referred to as a "channel set") consisting of at least one main channel and branches therefrom into the individual mold cavities, there is a substantial amount of sprue, which may be of relatively complex form, to be removed. Usually it consists at least of a main stalk having runners leading to each individual mold cavity, with a terminal gate representing the actual entry into the individual mold cavity. It is primarily to the problem of removal of sprue in injection molding machines having multi-impression molds that the present invention is directed. At the same time it is to be appreciated that it could be applied to other types of injection molding machines even though its value may then not be so marked.

The removal of the sprue from a mold unit has, in the past, usually meant availability of space for access to, and clearance of, the mold component which carries the sprue, i.e. the mold part nearest the injector. From this follows a substantial mold-opening stroke and concommitant demands on machine bulk and molding cycle time.

This situation is aggravated in the case where the sprue-receiving mold component remains permanently in the molding zone, as in the case of the removal in-line type of injection molding machine, but even in the case of the turret type of machine, in which the molds are only temporarily located in the injection zone, it has been found necessary to go to the extra expense of three-part molds to deal with the problem.

With the object of avoiding these difficulties, the present invention provides, in an injection molding machine comprising a mold assembly and an injection means which are brought together in the performance of a molding operation, a sprue carrier which is formed with at least two separate and independent sprue channel sets and is movable to interpose one of said sets in a working position between said injection means and mold assembly at the time of each said molding operation and thereafter to move this channel set out of the way and bring the other such set into this working position, said sprue carrier comprising a plate having formed therein a system of open-sided sprue channels comprising a main sprue channel communicating with a plurality of branches and arranged to register with an injection means. The plate also has formed therein bores extending through the plate and communicating with opposite end portions of the sprue channel system. At an ejection station remote from the injection station there is provided a stationary ejector unit which is rendered effective by reciprocation of the sprue carrier plate to cause ejection of a sprue structure therefrom. In accordance with a further feature of the invention a sprue carrier plate is slidably mounted between rectilinear guide members on a head stock member of the machine for reciprocating movement relatively to the injection nozzle, and a hydraulic piston and cylinder assembly is provided for reciprocating the sprue carrier plate, the operation of the piston and cylinder assembly being initiated by the opening of the mold parts. It will be understood that the operation of the sprue carrier brings a clear channel set between the injection nozzle and the mold cavity and brings a channel set which is charged with sprue into registration with the sprue ejecting means.

The term "channel set" is intended to connote a channel or channels (e.g., the channels for the sprue and the runners to the individual mold cavities in a multi-impression mold) directing the flow of the plastic from the outlet of the injection nozzle to the gate of the mold cavity or, in the case of multi-impression molds, to the gates of the individual cavities.

Embodiments of the sprue-clearing system according to this invention are illustrated in the accompanying drawings, in which:

FIGURE 4 is a cross section on the line IV—IV of FIGURE 3.

FIGURE 5 is a partial view on the line V—V of FIGURE 3.

FIGURE 6 shows a further detail of this central part of the machine, being a partial view on the line VI—VI of FIGURE 3.

FIGURE 7 is a view similar to that of FIGURE 6 but showing a modified form of sprue plate in accordance with this invention.

FIGURE 8 is a cross section taken on the line VIII—VIII of FIGURE 7, and also shows a male mold part closed up to the female mold part of the latter.

FIGURE 9 is a similar cross section to that of FIGURE 8 but indicating a later stage in the operation of the machine and showing part only of the male mold carrier.

FIGURE 10 is a horizontal cross section similar to that of FIGURE 8, but showing the application of the principles of the latter to a modified form of injection molding machine employing twin injection cylinders, and FIGURE 11 illustrates the assembly of FIGURE 10, with part of the male mold arrangement omitted, the parts in this case being in a further working condition.

Figure 1:
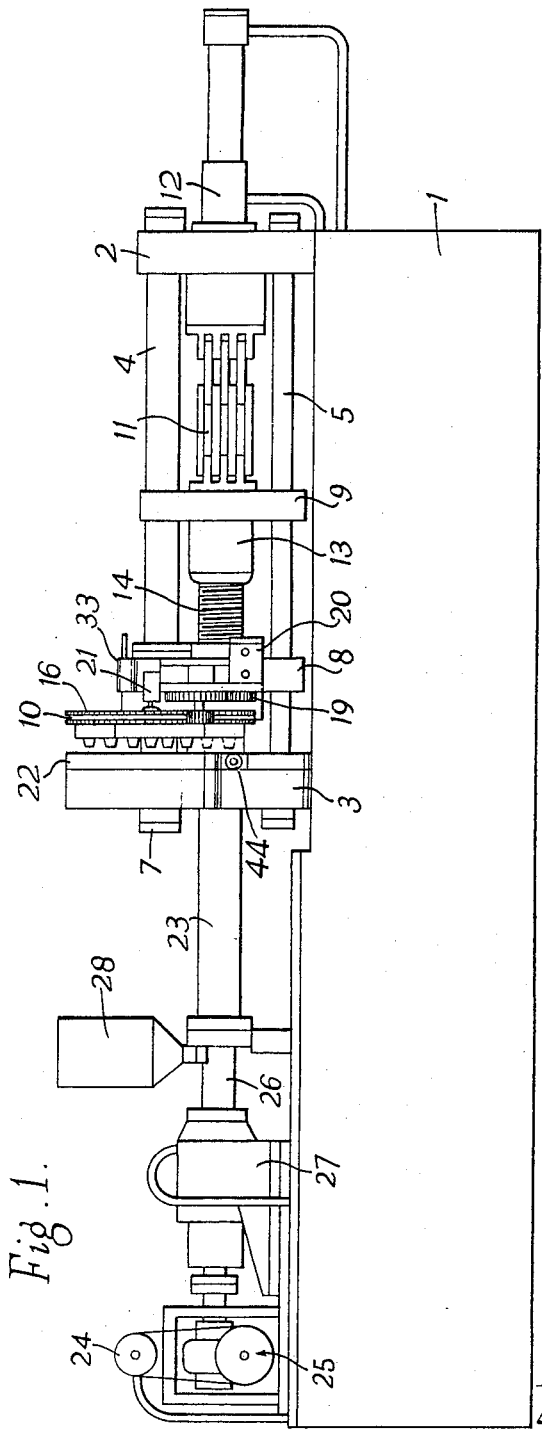
FIGURE 1 is a diagrammatic rear elevational view of a form of injection molding machine incorporating a first embodiment of the invention.
Figure 2:
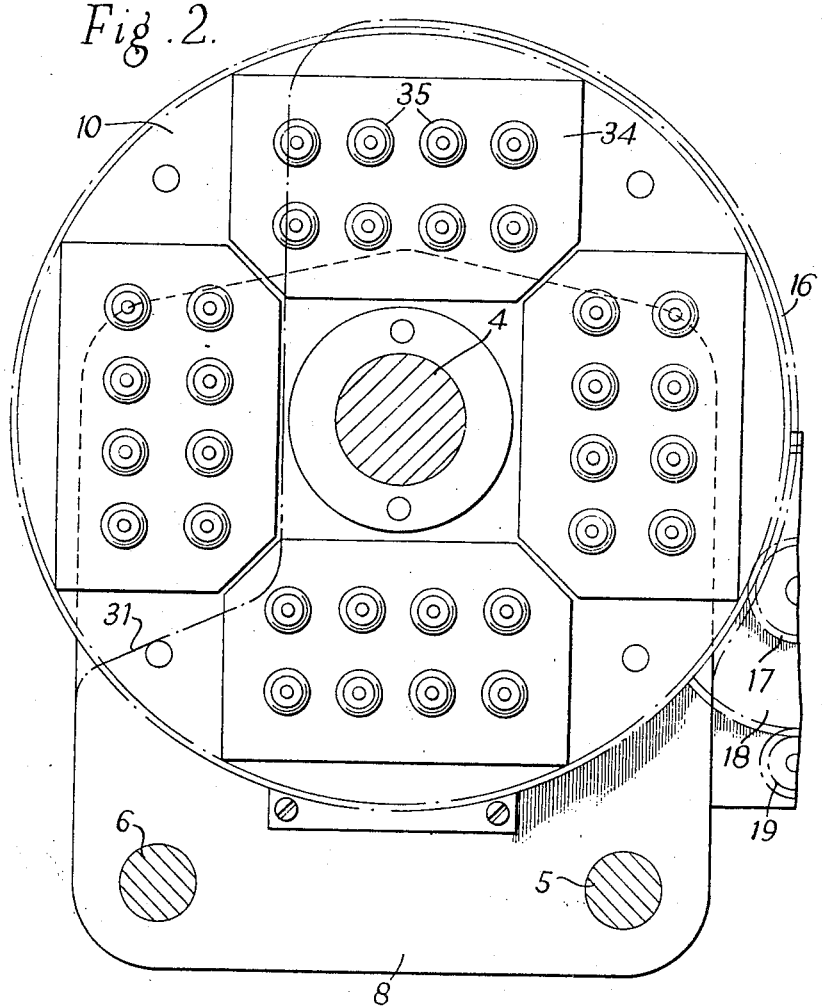
FIGURE 2 is an enlarged view of the core carrier and associated mechanism of this machine, the view being taken on the line II—II of FIGURE 3.

Referring first to the assembly illustrated in FIGURES 1 to 6, the injection molding machine in this case, as generally illustrated in FIGURE 1, is mounted on a bed or frame 1 from which upstands a fixed tailstock plate 2 and a fixed headstock plate 3. These are braced together by powerful tie bars 4, 5 and 6 (see also FIGURE 2) with clamping lock nuts 7. These bars are arranged in symmetrical triangular fashion with the largest bar 4 at the apex. Slidable on these tie bars are front and rear thrust plates, 8 and 9 respectively, and the former of these (which will hereinafter be referred to as "the backing plate") serves as a backing for the mold carrier plate or disc 10 which is slidable on the upper tie bar 4.

The required axial movements of the carrier plate 10 and its cores (to be described below) towards and away from the headstock 3 for closing and opening the machine are produced by known means comprising, in this case, a toggle linkage which is generally denoted 11 in FIGURE 1. This can be extended and collapsed at appropriate times, to close and open the molds, by the application of pressure oil to one end or the other of a hydraulic cylinder 12. The thrust plate 9 at the end of the toggle mechanism is coupled to the backing plate 8 by a screw 14 which is rotatable in a threaded nut 13 to adjust the distance between them. The mold carrier plate 10 is rotatable by means of a sleeve 15 on a bearing (not shown) projecting from plate 8.

This carrier plate 10 is circular and is provided with peripheral teeth 16, in mesh with a pinion 17 associated with a larger pinion 18 driven by the pinion 19 of a hydraulic motor 20 mounted on the backing plate 8. The carrier driving means 17 to 19 are operable to index the carrier plate 10 through steps of 90°, and the arrival of the carrier plate at each station is signalled by the operation, by cam pieces thereon, of a switch 21 which initiates the succeeding operations of closing the press, injecting the molds, etc. to be described below.

It will also be noted that the headstock plate 3 is fronted by an auxiliary headstock plate 22 which is slidable on the tie bars 4, 5 and 6 and is movable towards and away from the main headstock plate 3 when the press is closed and opened, respectively against the action of, and by, springs 39 surrounding dowels 40 which are attached to plate 22 and pass through headstock plate 3.

Provided at the other side of the headstock plate 3 is a normal form of in-line injector means and this is here illustrated as comprising an injector cylinder 23 in which a pre-plasticising screw (not shown) is rotated by means of a motor 24 through gearing generally indicated at 25. The casing 26 around the rear end part of the preplasticising screw is supported in a bearing 27 and the interior of this casing is supplied with solid plastic material in the usual way through a hopper 28.

The mechanism so far described in relation to FIGURES 1 to 6 of the drawings does not, per se, constitute part of the present invention, but is descriptive of the main elements of a form of machine incorporating the invention described in our prior patent application No. 25,714, filed April 29, 1960, now abandoned.

In accordance with the latter invention, it is arranged that male mould parts on the carrier plate 10 shall be brought in turn into register with a single female mould part which is aligned with the injector cylinder 23 the nozzle 29 of which passes through an opening 30 in the headstock. The arrangement in the machine illustrated in the accompanying drawings, as in our prior application referred to, is that each male mould part, when brought opposite the female mould part and the press closed, will make up a mould with this female part.

After injection of this mould the male mould part is moved away axially carrying the moulding with it, whereafter the carrier plate 10 is indexed through a further step to bring the next male mould part into register with the female mould part for a repetition of the moulding cycle. At a subsequent station, the said moulding is eventually brought opposite a cutaway or recess 31 in the side wall of the headstock plate 3 (and a corresponding recess 32 in the auxiliary headstock plate 22) and is there ejected by an ejector device which has been illustrated by way of example as a plunger mechanism at 33 in FIGURE 1 of the accompanying drawings.

Further, in these drawings it is assumed that a multi-impression moulding is to be formed at each shot of the injector, and for this reason each male mould part 34 comprises a block having eight tapered cores 35 outstanding therefrom. The single female mould part 36 has eight corresponding tapered cavities 37 and it is mounted by spring pressed studs 38 on the auxiliary headstock plate 22 at the injection zone (see particularly FIGURES 4 and 6).

Since eight such cavities are to be serviced each time by a single shot of plastic material from the injector nozzle 29, it is appreciated that there will be a considerable amount of plastic sprue and runners leading to the various cavities and that, since there only one single female mould part 36 is in use, it is desirable that there shall be means for rapidly clearing the sprue and runners to this multi-impression mould part quickly after each shot, thereby readying it for co-operation with the next-arriving male mould part. Further, one of the great advantages of this form of machine is that the press needs to be opened only far enough to allow the withdrawn moulding to clear the female mould part, as explained in our prior application referred to above, and it is therefore also desirable that the sprue clearance shall not make further significant demands on this opening stroke.

These problems are met by the system according to the present invention (which is, however, also applicable with advantage to other forms of injection moulding machine as indicated above) by the disposal, between the injector nozzle 29 and the female mould part 36, of a circular sprue carrier plate 41 which is equipped with two sprue channel sets and which is rotatable to move each of these sets alternately into a sprue receiving position ready for injection. It is arranged that the plate shall, when the press is closed under pressure, in effect be clamped between the injector nozzle and the female mould part so that it will accommodate and retain all the sprue between these two latter at the end of an injection shot. It is also arranged that a minimum amount of axial parting movement, between the sprue plate and the female mould part on the one hand, and between the injector nozzle and this plate on the other hand, will break the pin gates of the sprue and at the same time provide sufficient clearance for the plate to take away one channel set from the injection zone and substitute another there ready for the next shot.

This is accomplished in the present instance by mounting the plate 41 with a smooth rotary, sliding fit in a recess of corresponding shape in the auxiliary headstock plate 22, and mounting on the rear side of this sprue plate 41 a pinion 42 which is in mesh with an operating rack 43 mounted in a bore in the auxiliary headstock plate 22 and which carries a pin 45 for operating the plate 41. The loose mounting of plate 41 allows it to be replaced quickly and easily by equivalent plates serving mounds of different pattern.

The rack 43 is horizontally reciprocable by an oil cylinder 44. The oil supply to this cylinder 44 is correlated with that to the cylinder 20 controlling the rotation of the male mould carrier 10, such that the sprue plate 41 will be rotated through 180°, each time that this carrier plate is indexed one quarter of a turn to bring a fresh male mould part into injection position opposite the female mould part 36.

It is, of course, imperative that the rotation of the sprue plate 41 shall be accurately controlled, and it will be observed that for this reason plate 41 is provided with diametrically opposed notches 46, co-operating with a spring pressed locating plunger 47 (see FIGURE 6) which, on engagement in a notch 46, interrupts the contacts of a safety microswitch 48 to allow closing of the press, i.e., the supply of fluid to cylinder 12.

As will be seen particularly from FIGURE 6 of the drawings, each channel set in the particular instance illustrated comprises open-sided runners channels 49 which lead to transverse terminal ducts 51 communicating with the pin gates of the respective cavities of the female mould parts, and which branch from a central channel 50 forming the inlet from the injection nozzle 29, which is of the self sealing type. It is also to be noted that the terminal ducts 51 extend through the full thickness of the plate 41 for reasons which will later become apparent.

Figure 3:
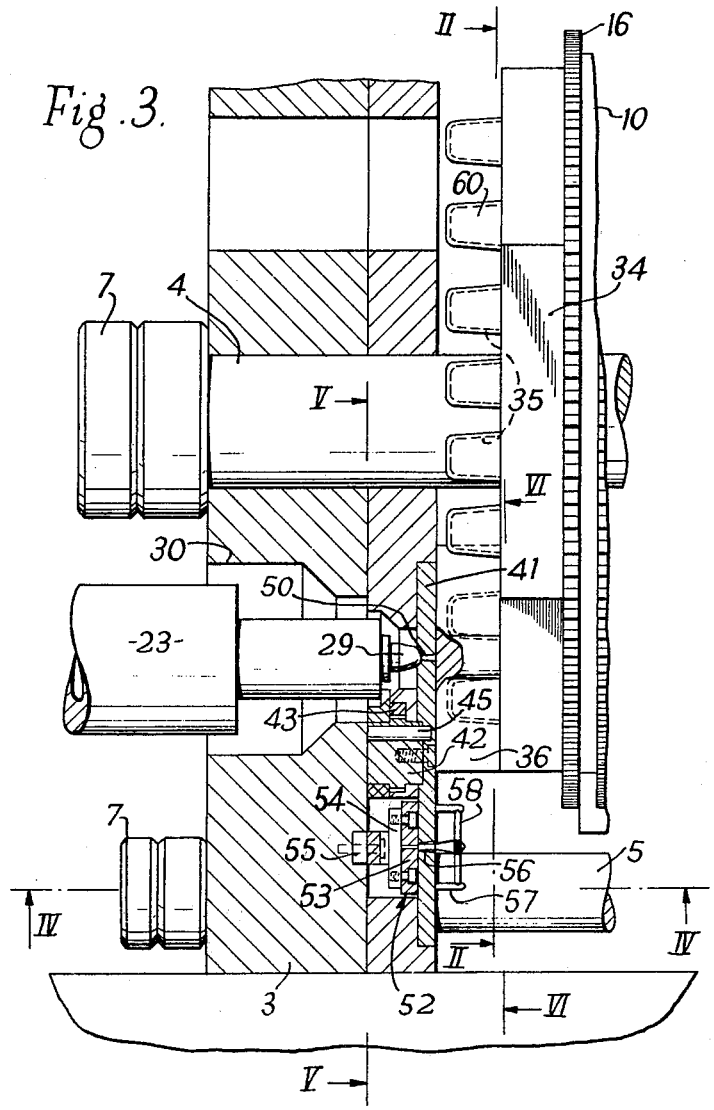
FIGURE 3 illustrates the central part of the machine illustrated in FIGURE 1.

The sprue clearing means which is operable to clear each sprue-loaded channel set in turn comprises an ejector unit 52 which is arranged below the femal mould part at a position which is fronted by a clear space even when the press is closed (see particularly FIGURE 3). This unit comprises a bar 53 supported by cross members 54 on a spigot 55 which is received in the headstock 3 and allows the unit to be readily replaced to suit different sprue channel patterns. The bar 53 has ejector pins 56 extending forwardly therefrom, these being positioned to coincide with the eight sprue stubs 57 formed in the terminal ducts 51 at the ends of the runners 58 of this sprue, and with the central sprue stalk 59 formed in the channel 50. Thus, when the press is closed, the sprue structure in the channel set at the lower positions (designated B in FIGURE 6) will be automatically pushed out by the pins 56 so as to dislodge and discharge this sprue as shown in FIGURE 3.

The operation of the sprue clearing means described will be apparent from the foregoing description, but can be briefly sumed up as follows:

After a moulding shot, starting with the press open as in FIGURE 4, compressed oil is applied to the cylinder 20 to cause rotation of the male mould carrier 10 through 90°, so carrying off the articles moulded during the preceding injection shot. In the case illustrated these mouldings are assumed to be tapered tumblers 60.

At the same time, oil applied to the cylinder 44 brings about the rotation of sprue plate 41 to take down the sprue-loaded channel set to the bottom position B and substitute an empty set in the injection zone. The stubs 57 ensure a positive retention of the sprue in the moving plate 41. At the end of this movement the parts are in the position illustrated in FIGURE 4.

Thereupon the press is closed to bring the parts into the position illustrated in FIGURE 3. In performance of this movement the male mould cores are first advanced axially into the female mould cavities 37, and the so-engaged male and female mould parts 34 and 36 are advanced against the action of springs 38 to bear against the auxiliary headstock plate 22 and to press the latter, in opposition to springs 39, against the headstock plate 3. As explained above, this automatically brings about the ejection of sprue from the bottom channel set at B.

The injector cylinder 23 is brought in to perform the injection, whereafter the cylinder 12 is operated to collapse the toggle mechanism 11 and so allow the press to open, auxiliary headstock plate 22 moving away from the male mould part 34 under the action of springs 39 and the female mould part 36 away from the auxiliary headstock plate under the action of springs 38. The cycle is then repeated as described above.

The sprue removal in the arrangement so far described is based on the use of a plate which reciprocates through a rotary arc of 180°. FIGURES 7 to 9 illustrate modified method of sprue removal, assumed to be utilised in a similar machine, in which the sprue carrier is arranged to reciprocate in rectilinear fashion. Thus, in these figures, the same references are used as in FIGURES 1 to 6 to designate like parts.

In the modified assembly there is again a sprue removal plate, in this case designated 63, but here it comprises two side by side sets of sprue channels, respectively designated 61 and 62, serving a female multi-impression mould part 36 similar to that of the preceding figures.

The plate 63 is slidably mounted in upper and lower guides, 64 and 65 respectively, bolted to the auxiliary headstock plate 22, and is arranged to reciprocate, from right to left, and vice versa, under the action of a rod 66 operated by an oil cylinder 67 also mounted on the auxiliary headstock plate and timed with the press opening and closing means. Thus, each of the channel sets 61 and 62 has two alternative positions in which it is disposed centrally in the injection zone (as in the case of the set 62 in FIGURE 7) or at an outer withdrawn position.

Disposed at each side of the central zone, in register with these respective outer positions and mounted by a screwed stem 75 on the headstock plate 3, is a sprue clearing unit 68 which is similar to the unit 53 described above. The arrangement then is that each time that the press is closed for an injection shot, a cleared channel set will be brought between the injection nozzle 29 and the single female mould part 36, whilst the other channel system will be pressed against the right hand or the left hand ejector unit 68, as the case may be, so that the pins 56 of the latter push out the sprue, as indicated at 69 in FIGURE 8.

FIGURE 9 shows the parts in the position they occupy when the male mould carrier has been withdrawn, and it will be noted that the auxiliary headstock plate 22 has been parted from the headstock plate 3 (by the normal spring means which have not here been shown), and the female mould part 36 from the auxiliary headstock plate 22, again by spring means (not shown). It will there be seen that each ejector unit 68 has, in effect, been retracted from sprue plate 63 into the recess 76 which is provided therefor on the auxiliary plate 22 by the provision of a backing piece 77 at the central part of the latter.

It will be appreciated that, in the arrangement illustrated in FIGURES 8 and 9, the sprue plate 63 can be quickly removed, and equally quickly replaced, in the guides 64 and 65 by a different form of plate suited to a change in female mould pattern. Similarly the ejector units 68 can be correspondingly changed without trouble.

The sprue removal system described above, both of the rotary- and horizontally-reciprocating types, lends itself very effectively to a modification in which shots from two independent injection nozzles are applied to moulds at the same moulding zone. The two nozzles may, for instance, be used to inject plastic of different colours or different constitution, to the same or different moulds but, for simplicity of exposition, it will be assumed below that it is intended to inject successive multi-impression moulds with thermoplastic materials of different colours.

An example, as applied to a rectilinearly-reciprocable system similar to that of FIGURES 7 to 9 is illustrated in the accompanying FIGURES 10 to 11. Here again like parts are depicted by the same reference numerals, but it will be noted that here the twin-injection cylinders are denoted 70 and 71 and their nozzles 29 are arranged side by side at the injection zone. It will also be observed that, in this case, the two channel sets are slightly varied in form, that is to say the main sprue channel, corresponding to 50 in FIGURES 1 to 6, and respectively designated 72 and 73 in the case of these two sets, in offset to agree with the offsetting of the corresponding cylinder nozzle 29 from the central axis of the mould set-up.

It will also be noted that a recess 74 is provided in each plate area, corresponding to one of the channel sets, at a position to receive the nozzle of the injector which is not in use at the time, thereby avoiding opening of the self-sealing equipment of the nozzle.

In an instance where a rotary sprue removal, of the form illustrated in FIGURES 1 to 6 of the drawings, is used with a twin-cylinder injector assembly, the sprue inlet, e.g. 50 in FIGURE 6, will be moved to one side and the other of the central position in the two channel sets to agree with the differing positions of the respective nozzles, and each channel set will serve one of these nozzles only.

We claim:

1. An injection molding machine having a molding assembly, an injection means and operating means for closing said molding assembly and for bringing it into registration with said injection means for the performance of an injection shot, said machine being characterized by a sprue carrier plate having formed therein a system of open-sided sprue channels, said sprue carrier plate having formed therein a main sprue channel communicating with said system of sprue channels and arranged to register with the injection means in an injection station, said sprue carrier plate also having formed therein bores extending through the plate and communicating with opposite end portions of the sprue channel system, an ejection station remote from the injection station, a stationary ejector unit in the ejection station, and means for reciprocating the sprue carrier plate between the ejection station and the injection station.

2. An injection molding machine having a head stock member, a tail stock member, a first mold part carried by the head stock member, a complemental mold part carried by the tail stock member, means for effecting relative movement of the head stock member and the tail stock member for closing the mold parts in a charging station, mold charging means including a nozzle, a sprue carrier plate positioned between the nozzle and said first mold part, said sprue carrier plate having spaced channel sets, rectilinear guide members on the head stock member in which the sprue carrier plate is mounted for reciprocating movement relatively to the nozzle, a hydraulic piston and cylinder assembly for reciprocating the sprue carrier plate, sprue ejecting means, and means operated by the opening of the mold parts for causing the operation of the piston and cylinder assembly thereby to shift the sprue carrier plate in order to bring a clear channel set between the nozzle and said first mold part and to bring a charged channel set into registration with the sprue ejecting means.

References Cited in the file of this patent

UNITED STATES PATENTS

| | | |
|---|---|---|
| 2,226,408 | Nast | Dec. 24, 1940 |
| 2,459,048 | Schwartz et al. | Jan. 11, 1949 |
| 2,894,284 | Allison et al. | July 14, 1959 |

FOREIGN PATENTS

| | | |
|---|---|---|
| 994,417 | France | Nov. 16, 1951 |
| 900,748 | Germany | Jan. 4, 1954 |